(12) United States Patent
Becker et al.

(10) Patent No.: US 8,941,351 B2
(45) Date of Patent: Jan. 27, 2015

(54) EMERGENCY ADJUSTMENT DEVICE FOR BLADE PITCH ADJUSTMENT SYSTEMS FOR WIND ENERGY INSTALLATIONS

(75) Inventors: Stephan Becker, Grossostheim (DE); Bernd Spatz, Waldaschaff (DE)

(73) Assignee: Robert Bosch GmbH, Stuttgart (DE)

( * ) Notice: Subject to any disclaimer, the term of this patent is extended or adjusted under 35 U.S.C. 154(b) by 401 days.

(21) Appl. No.: 13/380,512

(22) PCT Filed: May 6, 2010

(86) PCT No.: PCT/EP2010/002775
§ 371 (c)(1),
(2), (4) Date: Mar. 12, 2012

(87) PCT Pub. No.: WO2010/149246
PCT Pub. Date: Dec. 29, 2010

(65) Prior Publication Data
US 2012/0169051 A1 Jul. 5, 2012

(30) Foreign Application Priority Data
Jun. 23, 2009 (DE) .......... 10 2009 029 884

(51) Int. Cl.
*H02P 27/04* (2006.01)
*H02P 25/16* (2006.01)
*F03D 7/02* (2006.01)
*F03D 11/00* (2006.01)
*H02P 9/00* (2006.01)

(52) U.S. Cl.
CPC ............. *H02P 25/16* (2013.01); *F03D 7/0224* (2013.01); *F03D 11/00* (2013.01); *F03D 11/0033* (2013.01); *F05B 2260/76* (2013.01); *H02P 2009/004* (2013.01); *Y02E 10/721* (2013.01); *Y02E 10/722* (2013.01); *Y02E 10/723* (2013.01)
USPC .......................................................... 318/807

(58) Field of Classification Search
USPC ............................................. 290/44; 318/807
See application file for complete search history.

(56) References Cited

U.S. PATENT DOCUMENTS 3,344,326 A * 9/1967 Risberg .......................... 318/798
3,461,373 A * 8/1969 Mokrytzki ...................... 363/42

(Continued)

FOREIGN PATENT DOCUMENTS

DE          103 35 575 A1    3/2005
DE   10 2006 015 511 A1    10/2007

(Continued)

OTHER PUBLICATIONS

International Search Report corresponding to PCT Application No. PCT/EP2010/002775, mailed Jun. 24, 2011, (German and English language documents) (6 pages).

*Primary Examiner* — Joseph Waks
(74) *Attorney, Agent, or Firm* — Maginot, Moore & Beck LLP

(57) ABSTRACT

An adjusting device for rotor blades of a wind power plant is disclosed. An AC motor is provided for adjusting the angle setting of the rotor blades. An input serves for receiving an input alternating current. A frequency converter is provided for generating a second alternating current having a second frequency, wherein the second alternating current drives the AC motor. Additionally, a DC voltage source and an inverter are provided for converting the voltage provided by the DC voltage source into an alternating current for the AC motor. The inverter is thereby separated from the frequency inverter.

15 Claims, 5 Drawing Sheets

(56) References Cited

U.S. PATENT DOCUMENTS

| | | | | |
|---|---|---|---|---|
| 3,875,496 | A | * | 4/1975 | Carsten ............................ 363/97 |
| 5,045,988 | A | * | 9/1991 | Gritter et al. .................... 363/35 |
| 7,221,121 | B2 | * | 5/2007 | Skaug et al. ................... 318/807 |
| 7,355,294 | B2 | * | 4/2008 | Teichmann ..................... 290/44 |
| 8,796,966 | B2 | * | 8/2014 | Peto ......................... 318/400.19 |
| 2014/0028237 | A1 | * | 1/2014 | Park et al. ..................... 318/504 |

FOREIGN PATENT DOCUMENTS

| EP | 1 852 605 | A2 | | 11/2007 |
|---|---|---|---|---|
| GB | 1465522 | A | * | 2/1977 |

* cited by examiner

EMERGENCY ADJUSTMENT DEVICE FOR BLADE PITCH ADJUSTMENT SYSTEMS FOR WIND ENERGY INSTALLATIONS

This application is a 35 U.S.C. §371 National Stage Application of PCT/EP2010/002775, filed on May 6, 2010, which claims the benefit of priority to Serial No. DE 10 2009 029 884.3, filed on Jun. 23, 2009 in Germany, the disclosures of which are incorporated herein by reference in their entirety.

BACKGROUND

The disclosure relates to an emergency adjustment device for blade pitch adjustment systems for wind energy installations.

Wind energy installations, which produce electrical energy from the wind, have rotors with variable-pitch blades. The angle of the rotor blades governs the area on which the wind acts, thus making it possible to adjust the power of the wind energy installation. The angle is substantially dependent on the wind speed. When a limiting speed is reached, the blades are set such that the wind acts on a small an area as possible. The aim of this is to prevent the wind power machine from being damaged. The position in which the wind has no area to act on is referred to as the feathered position.

It is possible for the adjustment of the rotor blades which is carried out during normal operation no longer to be feasible in the event of a defect in the adjustment device, caused, for example, by a component failure after a lightning strike. The wind energy installation can in consequence reach an unacceptable high rotor rotation speed, which could result in destruction of the wind energy installation. It is therefore particularly important to ensure that the rotor blades are moved safely to the feathered position in the event of a failure such as this. This is referred to as so-called emergency adjustment.

In the case of wind energy installations, it is important for the wind energy installation not to be damaged in the event of failure of the supply system. The closed-loop control which is used to adjust the rotor blade angles during normal operation no longer operates if the supply system fails.

DE 103 35 575B4 discloses an emergency operating device in which voltage for the electric motor for adjustment of the rotor blades is made available by a converter. The converter contains a rectifier, an intermediate circuit and an inverter connected in series. An energy store is provided in the intermediate circuit, and ensures the power supply for the electric motor in the event of a power supply system failure. However, one problem in this case is that the converter electronics are at risk of failure. This is particularly the case if the power supply system failure has been caused by a lightning strike on the wind energy installation, since the voltage increase caused by the lightning can damage the electronics.

The object of the disclosure is to provide an adjustment device for rotor blades of a wind energy installation, with the adjustment device being less susceptible to defects than the adjustment devices known from the prior art.

This object is achieved by the subject matter of the independent claim. Advantageous developments are specified in the dependent claims.

According to the disclosure, an adjustment device is provided for rotor blades of a wind energy installation, in which an alternating-current motor is provided for adjusting the angular position of the rotor blades. An input is used for receiving an input alternating current. A frequency converter is provided for producing a second alternating current at a second frequency, with the second alternating current driving the alternating-current motor. Furthermore, a DC voltage source and an inverter are provided for converting the voltage provided by the DC voltage source to an alternating current for the alternating-current motor. In this case, the inverter is separate from the frequency converter.

Since the inverter is provided separately from the frequency converter, particularly robust components can be used for the inverter. A microcontroller is preferably used for the frequency converter, since microcontrollers allow high energy efficiency, but are susceptible to defects, since microcontrollers are in the form of an integrated circuit. Only a small number of components need be provided for the inverter, thus decreasing the failure rates and increasing the reliability. It is also possible that the failure rates of these components can be calculated using conventional means.

For so-called alternating-current adjustment systems, adjustment systems with polyphase machines, preferably in the form of asynchronous motors, the present disclosure offers an equivalent reversionary level to conventional direct-current adjustment systems, adjustment systems using direct-current machines, preferably in the form of compound motors.

When using direct-current machines in the adjustment device of a wind energy installation, it is feasible for the energy stores in the uninterruptable power supply to be connected directly with the aid of a switch, allowing the rotor blades to be moved to the safe feathered position in this way.

However, at present, this solution is impossible for conventional alternating-current adjustment systems, since a polyphase motor cannot be operated directly with direct current. The present disclosure makes it possible to convert the DC voltage provided from the energy stores in the uninterruptable power supply, to be precise to a three-phase AC voltage allowing a polyphase motor to be operated.

In the case of direct-current adjustment systems, starting torques which occur can be reduced only by additional circuitry measures, for example a starting resistance in series with the armature winding. Because of the high ratings and the physical spaces, these starting resistances generally have to be fitted outside the switchgear cabinet. The duration of use of the starting resistances is controlled by timing relays, partially in redundant form. Because of the additional components and the wiring complexity, the system becomes more expensive, reducing the reliability.

The inverter preferably consists of discrete components, in order to make the inverter as robust as possible.

If the output signal from the inverter is at a fixed frequency, the alternating-current motor can be operated at a frequency at which it produces a high torque.

In one embodiment, the energy store is in the form of a capacitor. An energy store such as this can be made particularly robust, with the capability to store sufficient energy, as well, with the aid of double-layer capacitors.

In another embodiment, the energy store is in the form of a rechargeable battery. This can be charged at regular intervals during normal operation, in order that it can provide sufficient electrical power to swivel the rotor blades to the feathered position in the event of an emergency off.

In one embodiment, the alternating-current motor is in the form of a polyphase motor, and the inverter is designed for producing a polyphase current. This allows a conventional asynchronous machine or synchronous machine to be used as the alternating-current motor, with the inverter providing a current as is also produced by the frequency converter.

In the worst case, when an emergency adjustment is made to the feathered position, a load reversal can occur at the motor, particularly in the case of large wind energy installations, caused by an excessively high wind load or because of the gravitational forces on the falling blade. In this case, the motor operates as a generator. In order to prevent reactions, caused by generator voltage spikes, on the energy stores in the uninterruptable power supply, the excess energy must be dissipated by means of a suitable protection circuit.

The present disclosure operates with voltage measurement at the inputs of the connection to the energy stores. If the voltage is at a critical level, a discharge circuit is activated cyclically until the voltage has reached a safe level.

If the inverter has overvoltage protection on its direct-current side, excess voltage occurring during generator operation of the electric motor can be dissipated. This prevents the DC voltage source, for example the capacitor or rechargeable battery, from being destroyed by overvoltage.

In one embodiment, the inverter has a multiplicity of switches which are each provided between a node on the DC voltage side and a node on the AC voltage side. Each of the switches is controlled by a pulse-width-modulated signal. Such pulse-width-modulated signals can be produced by discrete components.

In a further embodiment, the control signals for the switches are produced by an apparatus which has an operational amplifier which, at its inputs, receives output signals from a sine-wave signal generator and a triangular-waveform generator.

A movement rate window should be complied with when moving to the feathered position in an emergency. In the case of direct-current adjustment systems, this can be achieved only with a high level of complexity, since the rotation speed of direct-current motors depends on the voltage of the energy stores in the uninterruptable power supply. In one embodiment, in addition to movement rate which can be set to be fixed, the disclosure also allows a ramp function during starting and braking. The ramp function is in general activated during starting and selectively during braking, by means of a switching contact, shortly before the feathered position is reached. This measure minimizes torque surges on components and structures throughout the entire wind energy installation.

The disclosure also relates to a wind energy installation having an adjustment device according to the invention. A wind energy installation such as this is distinguished by a high safety level during emergency disconnection.

The wind energy installation preferably contains a motor brake for the alternating-current motor. This allows the alternating-current motor to be stopped, for example in the event of a defect in the adjustment device.

BRIEF DESCRIPTION OF THE DRAWINGS

The disclosure will be explained in more detail using one exemplary embodiment and with reference to the figures, in which.

DETAILED DESCRIPTION

Figure 1:
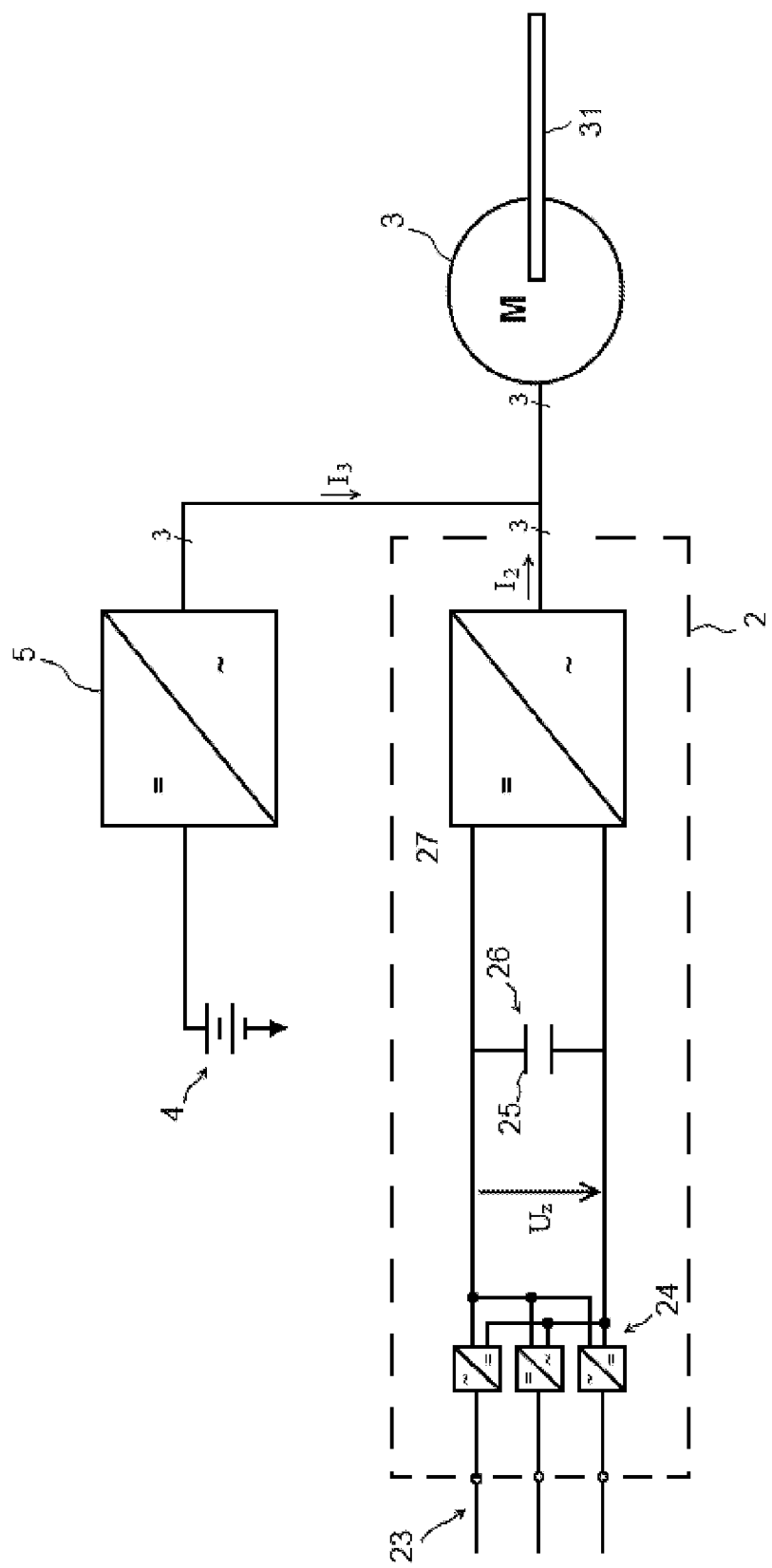
FIG. 1 shows a detail of an adjustment apparatus for rotor blades of a wind energy installation.

FIG. 1 shows an adjustment device 1 for rotor blades of a wind energy installation. The adjustment device 1 has a frequency converter 2, an electric motor 3, a battery 4 and an electrical inverter 5. The motor 3 operates a shaft 31 which adjusts the pitch angle of the rotor blades. The area on which the wind acts and therefore the power of the wind energy installation are governed by the pitch angle of the rotor blades. The angle is adjusted substantially as a function of the wind speed. However, when a limiting speed is reached, the blades are set such that the wind has a small an area to act on as possible. This position is referred to as the feathered position. The blades are also rotated to the feathered position when the supply system for the wind energy installation fails. This ensures that the motor for adjustment of the blades in the event of a power supply system failure operates safely even in the event of a power supply system failure.

The frequency converter 2 contains three input terminals 23, via which three sinusoidal, mutually phase-shifted, AC voltages are received from the supply system. These signals are each rectified by the rectifier 24, thus resulting in a DC voltage UZ in the intermediate circuit 26. The DC voltage UZ is smoothed by the capacitor 25. The inverter 27, which is also part of the frequency converter 2, in turn uses the DC voltage to produce three sinusoidal, mutually phase-shifted, voltages, thus resulting in a polyphase current being produced at the output of the frequency converter 2. The frequency of the polyphase current at the output of the frequency converter 2 is generally different from the frequency of the polyphase current received at the inputs of the frequency converter 2.

The inverter 5 is provided in addition to the frequency converter 2 and is used to provide polyphase current for the electric motor 3 if the power supply system voltage fails, that is to say when there is no input current for the frequency converter 2. In this case, the energy which is stored in the rechargeable battery 4 is converted via the electrical inverter 5 to polyphase current, in order to drive the motor 3, which itself rotates the shaft 31 such that the rotor blades are rotated to the feathered position.

Separation of the inverter 5 from the frequency converter 2 has the advantage that the inverter 3 can be formed from discrete, analog components. These are considerably less susceptible to defects than integrated circuits. In contrast, the frequency converter 2 is preferably in the form of a complex component, using one or more microcontrollers. Controllers such as these make it possible to provide an architecture which is as energy-saving as possible, because this is important for normal operation of the wind energy installation.

The inverter 5 ensures that an input signal which is as optimum as possible is made available for the connected motor 3. This results in the motor having a good operating behavior, since no major torque surges are caused by major voltage changes. For this reason, the inverter 5 provides sinusoidal signals. The electrical inverter 5 operates with relatively little wear, since there is no need to provide brushes and bearings.

The output signals 12 from the frequency converter 2 and the output signals 13 from the inverter 5 are connected to one another in a "wired-OR link". When the supply system is providing the input signal I1 to the frequency converter 2, the inverter 5 is switched off. If the supply system fails, the inverter 5 is switched on. In contrast, in the event of a supply system failure, the frequency converter 2 no longer provides any output voltages. Only one of the two components therefore ever drives the motor 3. In order to check whether the supply system has failed, a detector is provided, although this is not shown in the figure. In one alternative embodiment, a demultiplexer is provided instead of the "wired-OR" link, and selects one of the two signals I2 and I3 for passing onto the input terminals of the motor 3.

Figure 2:
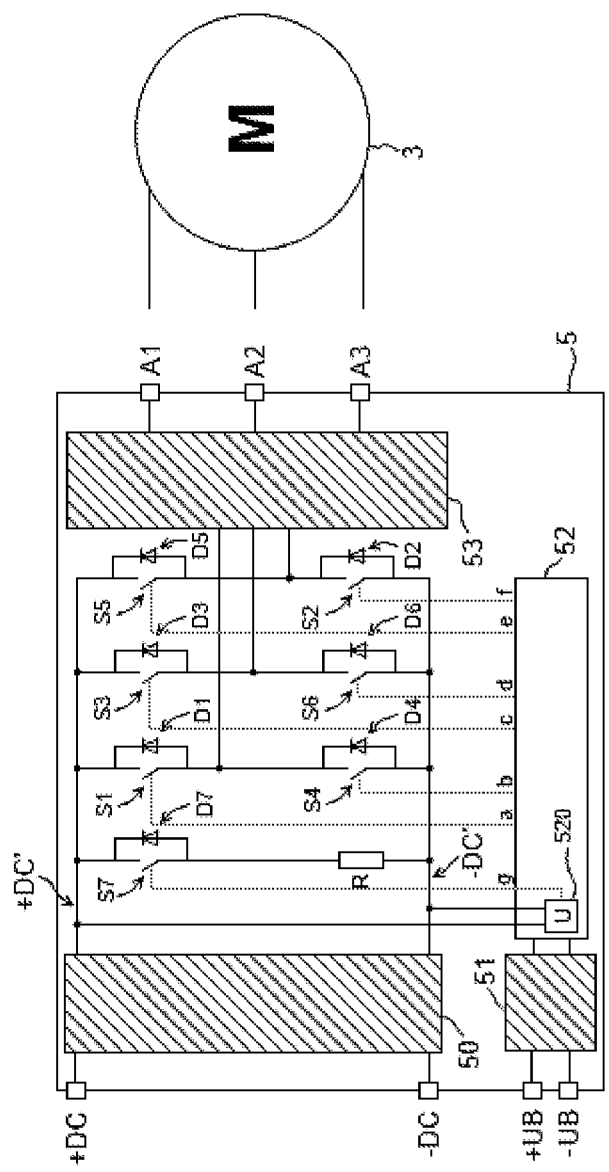
FIG. 2 shows details of an inverter for the adjustment device shown in FIG. 1.

FIG. 2 shows details of the inverter 5 shown in FIG. 1. The inverter 5 has the input terminals +DC, −DC, +UB and −UB. As output signals, it produces alternating-current signals at the output terminals A1, A2 and A3.

The inverter 5 has first overvoltage protection 50, second overvoltage protection 51, third overvoltage protection 53, a controller 52, a first switch S1, a second switch S2, a third switch S3, a fourth switch S4, a fifth switch S5, a sixth switch S6 and a seventh switch S7 as well as a resistor R. The node +DC' is connected via the first overvoltage protection 50 to the node +DC, while the node −DC' is connected via the first overvoltage protection 50 to the input −DC.

A series circuit comprising the switches S1 and S4, a series circuit comprising the switches S3 and S6, a series circuit comprising the switches S5 and S2, and a series circuit comprising the switch S7 and the resistor R are in each case provided between the nodes +DC' and −DC'. In this case, the switches S1, S3, S5 and S7 are each connected via a connection of the load path to the node +DC', while a connection of the load path of the switches S4, S6 and S2 as well as a connection of the resistor R are in each case connected to the node −DC'. The connecting node between the switches S1 and S4 is passed via the third overvoltage protection 53 to the output A1, the connecting node between the switches S3 and S6 is passed via the third overvoltage protection 53 to the output A2, and the connecting node between the switches S5 and S2 is passed to the output A3 via the third overvoltage protection 53.

The controller 52 is connected by two inputs via the second overvoltage protection 51 to the inputs +UB and −UB, while it is connected by two further inputs to the nodes +DC' and −DC'. The output signals from the controller 52 are output at its outputs a, b, c, d, e and f. The output a switches the switch S1, the output b switches the switch S4, the output c switches the switch S3, the output d switches the switch S6, the output e switches the switch S5, and the output f switches the switch S2.

A DC voltage from any DC voltage source is present at the connecting terminals +DC and −DC. This DC voltage source may consist of an energy store or a plurality of connected energy stores. For example, capacitors, preferably double-layer capacitors, and rechargeable-battery technologies, preferably lithium-ion rechargeable batteries, may be used as energy stores. In the described exemplary embodiment, this is the voltage of the battery 4.

A supply voltage is present at the terminals +UB and −UB, and in this case this voltage is likewise tapped off from the battery 4. An endless switching sequence is produced in the controller 52, opening and closing the switches S1 and S6 in a defined scheme. The switches S1 and S6 may be in the form of IGBTs (Insulated Gate Bipolar Transistors), power transistors or other power semiconductors.

In general, the apparatus is used to drive the polyphase machine such that a torque is produced for rotating the rotor blades. The wind which acts on the rotor blade can, however, revolve the load on the polyphase machine 3 at short notice, by driving the rotor blade. In this operating situation, the polyphase machine 3 acts as a generator.

The switch S7 and R are provided for generator operation. If the motor 3 is operated such that it increases the voltages at the outputs A1, A2 and A3, this leads to a reverse current flow and to an overvoltage at the terminals +DC and −DC. This overvoltage must be dissipated by suitable protection circuitry, provided by the switch S7 and the load resistance R. The voltage is dissipated by regularly opening and closing the switch S7. By way of example, the switch S7 may be in the form of an IGBT, power transistor or other power semiconductor. The protection circuit is controlled by a voltage detector 520 in the controller 52.

Figure 3:
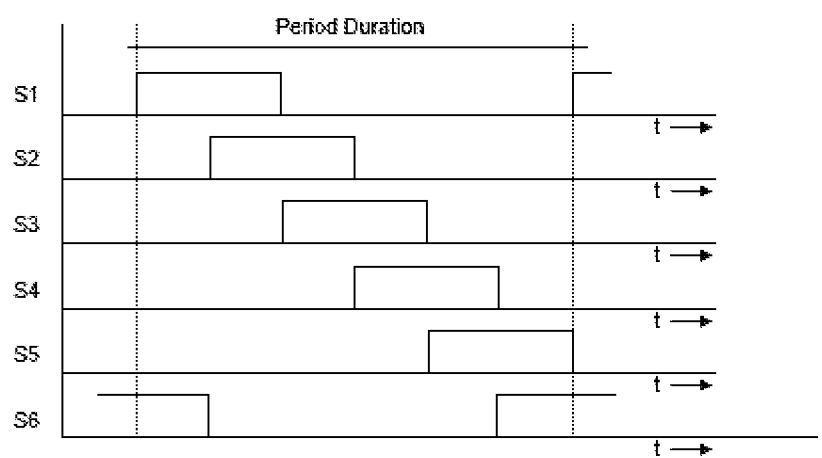
FIG. 3 shows control signals for switches for the inverter shown in FIG. 3.

FIG. 3 shows the control signals for the switches S1 to S6. The switches S1 to S6 are in each case operated periodically for short pulses. Within one period, each of the switches is connected for the time period of one pulse, while it remains switched off throughout the rest of the time. The switches are operated with a phase shift with respect to one another, with particular care being taken to ensure that two switches in a series circuit are never on at the same time. Block-by-block control of the switches S1 to S6 results in signals being produced with a phase shift of 120° with respect to one another.

This block commutation results in an alternating AC voltage being produced at the terminals A1, A2 and A3, which voltage is able to operate a polyphase machine, for example an asynchronous machine.

Figure 4:
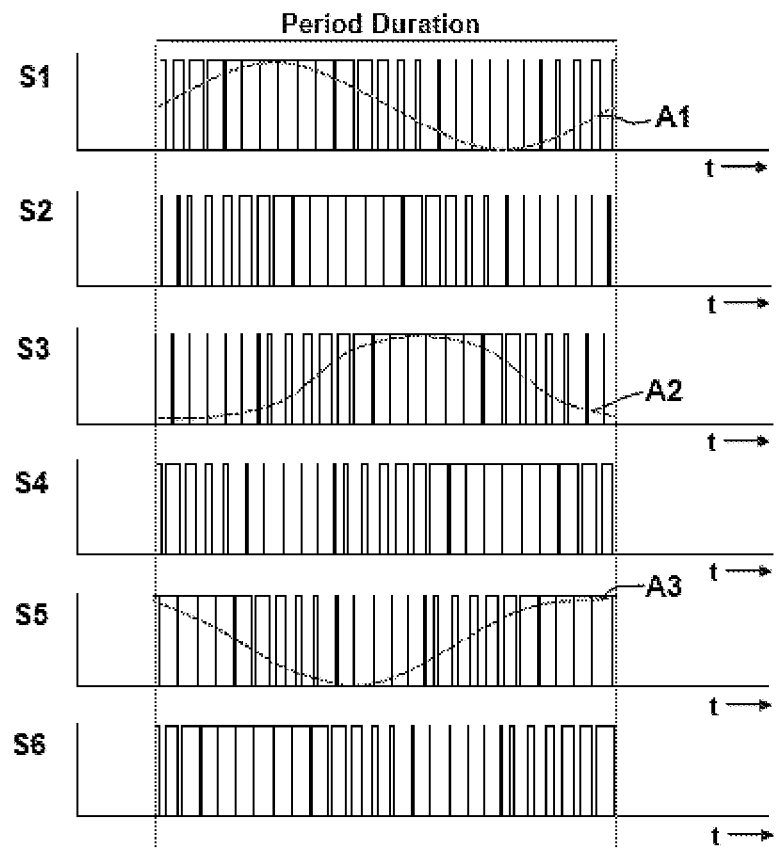
FIG. 4 shows signals at selected nodes on the inverter shown in FIG. 3.

FIG. 4 shows a pulse-width-modulated control signals for the switches S1 to S6 for the inverter 5, with two of the control signals for the switches S1 to S6 being varied in accordance with a sinusoidal function, within the period duration. The dashed lines in each of the graphs show the output voltages at the outputs A1, A2 and A3. It is self-evident that the inductively acting polyphase motor which is connected to these outputs provides a smoothing effect for the voltage.

Figure 5:
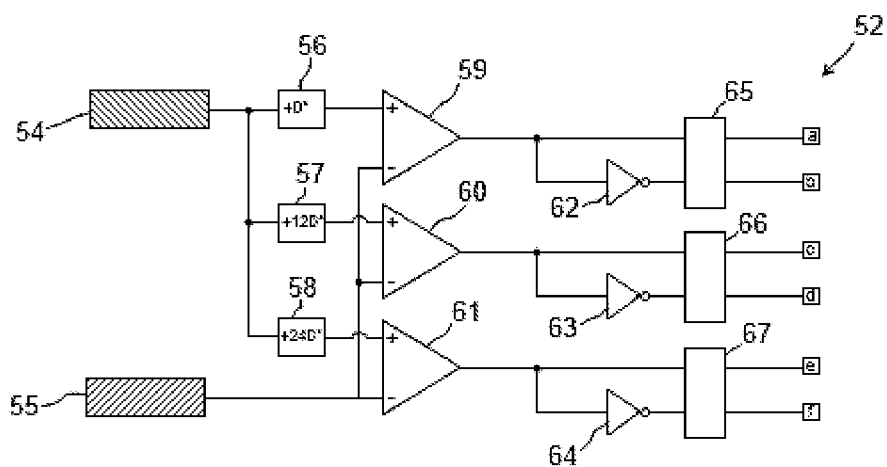
FIG. 5 shows details of the inverter shown in FIG. 2.

FIG. 5 shows a control circuit 53 which is part of the controller 52 shown in FIG. 2. The control circuit 53 contains a sine-wave generator 54, a triangular-waveform generator 55, phase-shifting blocks 56, 57 and 58, operational amplifiers 59, 60 and 61, inverters 62, 63, 64 and short-circuit protection means 65, 66 and 67. The inverting input of the operational amplifiers 59, 60 and 61 is in each case connected to the output of the triangular-waveform generator 55. The output of the sine-wave generator 54 is connected via the first phase shifter 56 to the non-inverting input of the operational amplifier 59, via the second phase shifter 57 to the non-inverting input of the operational amplifier 60, and via the third phase shifter 58 to the non-inverting input of the operational amplifier 61.

The output of the operational amplifier 59 is connected via the short-circuit protection means 65 to the output a and to the input of the inverter 62. The output of the operational amplifier 60 is connected via the short-circuit protection means 66 to the output c and to the input of the inverter 63. The output of the operational amplifier 61 is connected via the short-circuit protection means 67 to the output e. The output of the inverter 62 is connected via the short-circuit protection means 65 to the output b, the output of the inverter 63 is connected via the short-circuit protection means 66 to the output d, and the output of the inverter 64 is connected via the short-circuit protection means 67 to the output f.

The first phase shifter 56 does not produce any phase shift, that is to say its shift is 0°, while the shift of the phase shifter 57 is 120°, and that of the phase shifter 58 is 240°. The phase shift means the phase difference between the input signal and the output signal of the respective phase shifter.

The signals illustrated in FIG. 4 are produced by comparison of the sine-wave voltage with the triangular-waveform voltage in the operational amplifiers 59, 60 and 61. The control circuit 53 has as few analog modules as possible, and is formed discretely. The circuit is therefore designed to be as safe as possible, and continues to operate even in the event of a failure of the supply voltage and in the case of a lightning strike.

Figure 6:
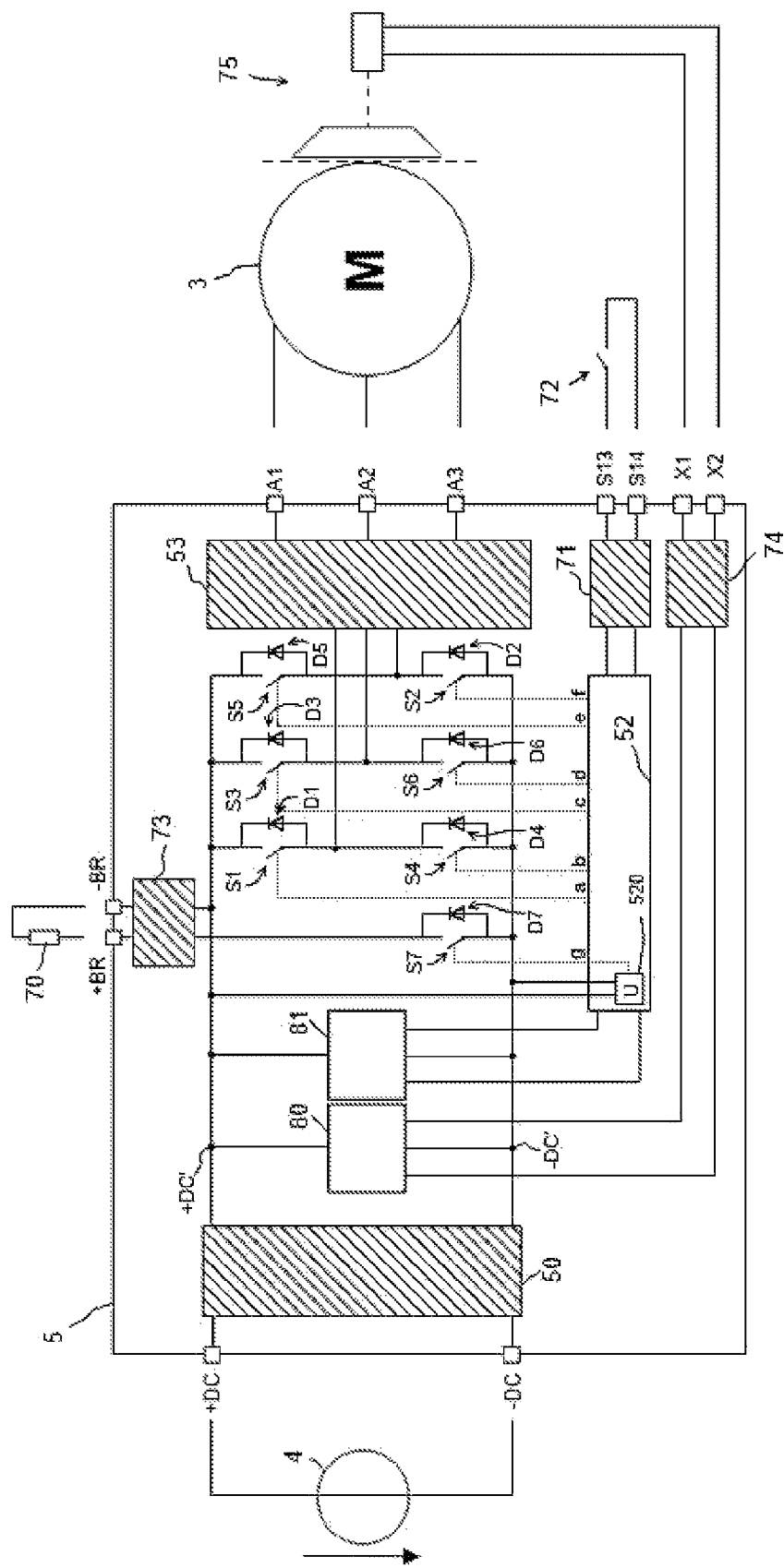
FIG. 6 shows a further embodiment of an inverter for the adjustment device shown in FIG. 1.

FIG. 6 shows a further embodiment of an inverter 5 for the adjustment device shown in FIG. 1. Components having the same functions as in the previous figures are annotated with the same reference symbols, and will not be explained again.

The emergency adjustment device has inputs +DC and −DC for connection of a DC voltage source 4. The DC voltage source 4 may consist of one or more series-connected or parallel-connected energy stores. Capacitors, in particular double-layer capacitors, lithium-based or lead-based rechargeable-battery technologies, may be used as energy stores.

The inverter 5 may be considered to be a black box and has inputs S13 and S14 which can be connected. A ramp function for braking, shortly before the feathered position is reached, is activated by a switch 72 through these inputs S13 and S14. The final disconnection takes place by disconnection of the DC voltage source at the input to the emergency adjustment device. The inverter 5 has additional outputs X1 and X2, which control a motor brake 75. The motor brake 75 can brake the motor 3, and bring it to rest.

Two voltage conditioners 80 and 81 are provided in the inverter 5. The voltage conditioner 80 uses the voltage between the nodes +DC' and −DC' to produce a voltage for the motor brake of, for example, 24 V. The voltage conditioner 81 produces a voltage for the controller 52.

When the DC voltage source 4 is connected to the terminals +DC and −DC, the motor brake 75 is controlled via the outputs X1 and X2 such that it is opened.

A controller 52 which controls the output to the braking resistance and to the polyphase motor operates within the emergency adjustment device. The controller 52 may be formed from discrete logic, one or more integrated circuits or a combination of both solutions. The controller 52 is supplied via dedicated voltage conditioning 51 through the input of the DC voltage source. It is self-evident that this voltage conditioning can also be provided externally.

The emergency adjustment device has outputs +BR and −BR for connection of an external braking resistance 70, which dissipates the energy during generator operation. The braking resistance 70 is controlled internally, preferably via a semiconductor switch S7, with the semiconductor switch having protection circuitry D7, formed by diodes or capacitors. The protection circuitry is controlled by a voltage detector 520 in the controller 52.

The emergency adjustment device has outputs A1, A2 and A3 for connection of a 3-phase polyphase motor 3, which is preferably in the form of an asynchronous motor. The outputs A1, A2 and A3 are formed internally, preferably by semiconductor switches S1 to S6, with the semiconductor switches each having protection circuitry D1 to D6, formed by diodes or capacitors.

Since this emergency adjustment device is provided for emergency adjustment of the rotor blades to the feathered position, it assumes a high importance in the overall system. All of the inputs and outputs are therefore connected to overvoltage protection devices 50, 53, 71, 73 and 74.

A Faraday's cage, formed by a housing structure, protects the inverter 5 against electromagnetic interference fields, dust and dirt.

Waste heat which occurs, caused by power losses in the emergency adjustment device, is emitted via the housing structure.

The operation can be described as follows:

The inverter 5 is activated by deliberately applying a DC voltage to its input, opening the motor brake.

The intelligence is activated by the internal voltage conditioning.

A controller controls the semiconductor switches S1 to S6 to set a constant polyphase motor rotation speed, following a starting ramp.

Throughout the entire operating duration, the voltage at the connecting terminals +DC and −DC of the energy store 4 is monitored. If this were to become too high, the intelligence would activate a discharge path, formed with a semiconductor switch S7 and an external braking resistance 70, thus allowing excess energy to be dissipated.

Further switching inputs S13 and S14 of the emergency adjustment device offer the capability to carry out a stopping process. This allows the rotation speed at the polyphase motor 3 to be reduced shortly before reaching the feathered position. The final position is approached "softly".

When the feathered position is reached, the DC voltage at the input is disconnected via a mechanical switch. The motor brake 75 is activated, and the polyphase machine 3 remains stationary.

LIST OF REFERENCE SYMBOLS

1 Adjustment apparatus for rotor blades
2 Frequency converter
3 Polyphase machine
5 Inverter
4 Battery
23 Input
24 Rectifier
25 Intermediate circuit
26 Capacitor
27 Inverter
50 First overvoltage protection
51 Second overvoltage protection
52 Controller
53 Third overvoltage protection
520 Voltage detector
54 Sine-wave generator
55 Triangular-waveform generator
56, 57, 58 Phase shifters
59, 60, 61 Operational amplifiers
62, 63, 64 Inverters
65, 66, 67 Short-circuit protection means
70 Braking resistance
71 Third overvoltage protection
72 Switch
74 Fourth overvoltage protection
75 Motor brake
80 voltage conditioning
81 voltage conditioning

The invention claimed is:

1. An adjustment device for rotor blades of a wind energy installation, comprising:
   an alternating-current motor configured to adjust the angular position of the rotor blades,
   a frequency converter including an input configured to receive an input alternating current at a first frequency, the frequency converter being configured to produce a first output alternating current at a second frequency from the alternating current input and to output the output alternating current to the alternating current motor, the first output alternating current being operable to drive the alternating-current motor,
   a DC voltage source, and
   an inverter provided separately from the frequency converter and including discrete, analog components, said inverter being configured to convert the voltage provided by the DC voltage source to a second output alternating current and to output the second output alternating current to the alternating-current motor, the second output alternating current being operable to drive the alternating-current motor.

2. The adjustment device as claimed in claim 1, wherein the second alternating output current provided by the inverter is at a fixed frequency.

3. The adjustment device as claimed in claim 1, wherein the DC voltage source is in the form of a capacitor.

4. The adjustment device as claimed in claim 1, wherein the DC voltage source is in the form of a rechargeable battery.

5. The adjustment device as claimed in claim 1, wherein the alternating-current motor is a polyphase motor, and the inverter is configured to produce a polyphase current.

6. The adjustment device as claimed in claim 1, wherein the inverter has overvoltage protection on a direct-current side thereof.

7. The adjustment device as claimed in claim 1, wherein the inverter has a multiplicity of switches in each case between a node on a DC voltage side of the inverter and a node on an AC voltage side of the inverter, with the switches each being controlled by pulse-width-modulated signals.

8. The adjustment device as claimed in claim 7, wherein the control signals for the switches are produced by an apparatus which has an operational amplifier which, at its inputs, receives output signals from a sine-wave signal generator and a triangular-waveform signal generator.

9. The adjustment device as claimed in claim 1, wherein the alternating-current motor is in the form of an asynchronous machine.

10. The adjustment device as claimed in claim 1, further comprising a voltage detector configured to detect the input AC voltage and to switch on the inverter.

11. The adjustment device as claimed in claim 1, wherein the inverter has a first mode for adjusting movement rate, which can be set to be fixed, of the alternating-current motor , and a second mode for adjusting a ramp function of the movement rate of the alternating-current motor.

12. The adjustment device as claimed in claim 11, further comprising a switch configured to activate the second mode shortly before a rotor of the wind energy installation reaches a feathered position.

13. The adjustment device as claimed in claim 1, wherein the inverter contains at least one integrated circuit.

14. A wind energy installation, comprising:
rotor blades; and
an adjustment device including:
    an alternating-current motor configured to adjust the angular position of the rotor blades,
    a frequency converter including an input configured to receive an input alternating current at a first frequency, the frequency converter being configured to produce a first output alternating current at a second frequency from the alternating current input and to output the output alternating current to the alternating current motor, the first output alternating current being operable to drive the alternating-current motor,
    a DC voltage source, and
    an inverter provided separately from the frequency converter, said inverter being configured to convert the voltage provided by the DC voltage source to a second output alternating current and to output the second output alternating current to the alternating-current motor, the second output alternating current being operable to drive the alternating-current motor.

15. The wind energy installation as claimed in claim 14, further comprising a motor brake provided for the alternating-current motor.

\* \* \* \* \*